(12) United States Patent
Rosseel et al.

(10) Patent No.: US 10,098,281 B2
(45) Date of Patent: Oct. 16, 2018

(54) ROTOR FEEDER UNIT FOR AGRICULTURAL MACHINES, METHOD FOR OPERATING A ROTOR FEEDER, AND METHOD FOR OPERATING AN AGRICULTURAL MACHINE

(71) Applicant: CNH Industrial America LLC, New Holland, PA (US)

(72) Inventors: Bram Rosseel, Snellegem (BE); Jeroen Devroe, Izegem (BE); Dries Liefooghe, Veurne (BE); Dieter Kindt, Vladslo (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/299,068

(22) Filed: Oct. 20, 2016

(65) Prior Publication Data
US 2017/0105348 A1 Apr. 20, 2017

(30) Foreign Application Priority Data

Oct. 20, 2015 (BE) .................................. 2015/5678

(51) Int. Cl.
*A01F 15/10* (2006.01)
*A01D 89/00* (2006.01)
*A01F 15/04* (2006.01)

(52) U.S. Cl.
CPC ............ *A01D 89/002* (2013.01); *A01F 15/10* (2013.01); *A01F 15/042* (2013.01); *A01F 2015/102* (2013.01)

(58) Field of Classification Search
CPC .......... A01F 15/00; A01F 15/08; A01F 15/10; A01F 2015/102; A01F 2015/107;
(Continued)

(56) References Cited

U.S. PATENT DOCUMENTS 5,979,153 A * 11/1999 Roth .................... A01F 15/0833
100/88
6,295,797 B1 * 10/2001 Naaktgeboren ...... A01D 89/008
56/341

(Continued)

FOREIGN PATENT DOCUMENTS

EP 1306003 A1 5/2003

OTHER PUBLICATIONS

EP16194588, Extended European Search Report, dated Mar. 17, 2017, 6 pages.

*Primary Examiner* — Jimmy T Nguyen
(74) *Attorney, Agent, or Firm* — Peter K. Zacharias; Patrick M. Sheldrake

(57) ABSTRACT

A rotor feeder unit for an agricultural baler. The rotor feeder unit includes a rotor feeder carrying a set of tines, a rotor feeder unit bottom distant from the rotor feeder forming a lower boundary of a conveying channel through the rotor feeder unit, and scrapers placed in conveying direction behind the rotor feeder. The rotor feeder is rotatable about an axis of rotation. The scrapers extend in between the tines and have a leading face cooperating with the tines. The rotor feeder unit also includes a scraper position adjusting arrangement adapted for displacement of the leading face of the scrapers relative to the rotor feeder unit bottom. The scraper position adjusting arrangement is further adapted for rotating the scrapers about the axis of rotation of the rotor feeder for angularly displacing the leading face of the scrapers relative to the rotor feeder unit bottom.

12 Claims, 4 Drawing Sheets

(58) Field of Classification Search
CPC .............. A01F 2015/108; A01F 15/042; A01D 89/002; A01D 90/04
See application file for complete search history.

(56) References Cited

U.S. PATENT DOCUMENTS

| | | | |
|---|---|---|---|
| 6,546,705 B2* | 4/2003 | Scarlett | A01F 15/00 56/10.2 R |
| 6,988,354 B1* | 1/2006 | Pargmann | A01D 90/04 56/341 |
| 7,124,568 B2 | 10/2006 | Hotaling | |
| 7,252,587 B2* | 8/2007 | Viaud | A01D 90/04 460/109 |
| 8,205,424 B1* | 6/2012 | Lang | A01D 90/04 56/341 |
| 8,813,466 B2* | 8/2014 | Van De Weijer | A01D 90/04 56/341 |
| 2003/0230466 A1* | 12/2003 | Swinderman | B65G 45/12 198/497 |
| 2005/0262822 A1 | 12/2005 | Hotaling | |

* cited by examiner

ROTOR FEEDER UNIT FOR AGRICULTURAL MACHINES, METHOD FOR OPERATING A ROTOR FEEDER, AND METHOD FOR OPERATING AN AGRICULTURAL MACHINE

CROSS REFERENCE TO RELATED APPLICATION

This application claims priority to Belgium Application No. 2015/5678 filed Oct. 20, 2015, the contents of which are incorporated herein by reference.

FIELD OF THE INVENTION

The present invention relates to a rotor feeder unit for agricultural machines, and more specifically to a rotor feeder unit for an agricultural baler. The present invention further relates to a method for operating a rotor feeder unit and to a method for operating an agricultural machine.

BACKGROUND OF THE INVENTION

Known agricultural balers are provided with a rotor feeder unit that feeds crop material, e.g. supplied by a pick-up device, into a bale forming cavity in case of a so called round baler or into a feeder duct, also known as pre-compression chamber, in case of a so called rectangular baler. Another agricultural machine that includes such a rotor feeder unit is a loading wagon. The rotor feeder unit of a loading wagon feeds the crop material, e.g. supplied by a pick-up device, into a storage hopper of the loading wagon.

Known rotor feeder units for agricultural machines in general comprise a rotor feeder carrying a set of tines, said rotor feeder being rotatable about an axis of rotation; a rotor feeder unit bottom wall distant from the rotor feeder forming a lower boundary of a conveying channel through the rotor feeder unit; and scrapers placed in conveying direction behind the rotor feeder, the scrapers extending in between the tines and having a leading face cooperating with the tines.

In operation, the rotor feeder is rotated about its axis of rotation by means of the rotor feeder drive, such that the tines carried by the rotor feeder pass through the conveying channel in a conveying direction. The tines carried by the rotor feeder take supplied crop material and force the crop material through the conveying channel in the conveying direction. The scrapers remove the cut crop material from the tines and guide it further in conveying direction through the conveying channel.

Rotor feeder units of the above kind are known that are additionally provided with cutting blades protruding from the rotor feeder unit bottom wall through the conveying channel besides moving paths of the cutting blades. In such rotor feeder units, also referred to as rotor cutter units, the crop material supplied thereto is cut while being conveyed through the conveying channel. In such conveyor units, in operation, the rotor feeder is rotated about its axis of rotation by means of the rotor feeder drive, such that the tines carried by the rotor feeder pass by the cutting blades in a conveying direction. The tines carried by the rotor feeder take supplied crop material and force the crop material over the cutting blades. The cutting blades cut the crop material into smaller pieces. During and/or after the cutting process, the scrapers remove the cut crop material from the tines and guide it further in conveying direction through the conveying channel.

SUMMARY OF THE INVENTION

The present invention has for its object to provide an improved rotor feeder unit, in particular a rotor feeder unit comprising a rotor feeder carrying a set of tines, said rotor feeder being rotatable about an axis of rotation; a rotor feeder unit bottom distant from the rotor feeder forming a lower boundary of a conveying channel through the rotor feeder unit; scrapers placed in conveying direction behind the rotor feeder, the scrapers extending in between the tines and having a leading face cooperating with the tines.

The rotor feeder unit according to the invention comprises a scraper position adjusting arrangement adapted for displacement of the leading face of the scrapers relative to the rotor feeder unit bottom.

The leading face of the scrapers cooperates with the tines to remove the crop material from the tines and guide it further in conveying direction through the conveying channel. The leading face of the scrapers thereby form an upper boundary of the conveying channel through the rotor feeder unit, while the rotor feeder unit bottom forms a lower boundary of a conveying channel. In order for the scrapers to effectively guide the crop material further in conveying direction, the shape of the end of the conveying channel formed between the leading face of the scrapers and the rotor feeder unit bottom, in particular in a plane perpendicular to the axis of rotation of the rotor feeder, is that of a reverse funnel. The scraper position adjusting arrangement according to the invention allows for displacing the leading face of the scrapers relative to the rotor feeder unit bottom, thereby adjusting the reverse funnel shape of the end of the conveying channel formed between the leading face of the scrapers and the rotor feeder unit bottom. By displacement of the leading face of the scrapers relative to the rotor feeder unit bottom, in particular in a plane perpendicular to the axis of rotation of the rotor, the reverse funnel shape of the end of the conveying channel can be widened or narrowed. Widening or narrowing the reverse funnel shape of the end of the conveying channel changes the velocity of the flow of cut crop material exiting the conveying channel. Moreover, widening the reverse funnel shape of the end of the conveying channel reduces the back pressure exerted by the crop material on the rotor, thereby reducing the power required to drive the rotor. Narrowing the reverse funnel shape of the end of the conveying channel provides the opposite. The scraper position adjusting arrangement according to the invention allows for adjusting the reverse funnel shape of the end of the conveying channel to specific operational circumstances. For instance in case of more dense crop material, for instance wet crop material, widening the reverse funnel shape of the end of the conveying channel by adjusting the position of the leading face of the scrapers relative to the rotor feeder unit bottom, allows for compensation of the increased power that is required for conveying such dense crop material through the end of the conveying channel.

In a preferred embodiment of the rotor feeder unit according to the invention, the scraper position adjusting arrangement is adapted for rotating the scrapers about the axis of rotation of the rotor for angularly displacing the leading face of the scrapers relative to the rotor feeder unit bottom. This feature allows for angularly displacing the leading face of the scrapers relative to the rotor feeder unit bottom without adjusting the so-called scraper angle, i.e. the angle of the leading face of the scrapers relative to the leading face of the tines. This has the advantage that displacing the leading face of the scrapers relative to the rotor feeder unit bottom in accordance with the present invention does not affect the angle between the leading face of the tines and the leading face of scrapers, thereby leaving the cooperative action of the tines and the scrapers unaffected.

Alternatively or additionally, the scraper position adjusting arrangement is adapted for displacing the leading face of the scrapers relative to the rotor feeder unit bottom such that the angle of the leading face of the scrapers relative to the leading face of the tines is adjusted. In order to allow for adjusting the angle of the leading face of the scrapers relative to the leading face of the tines, the scraper position adjusting arrangement is preferably is provided with an arrangement for translating the leading face of the scrapers relative to the axis of rotation of the rotor feeder and/or rotating the leading face of the scrapers around an axis of rotation offset from the axis of rotation of the rotor feeder. The extend of adjustment of the angle of the leading face of the scrapers relative to the leading face of the tines depends on the extend of displacement of the leading face of the scrapers relative to the rotor feeder unit bottom and on the shape of the leading face of the scrapers. In view of the latter, the leading face of the scrapers may advantageously be shaped such that a certain translation of the leading face of the scrapers relative to the axis of rotation of the rotor feeder and/or rotation of the leading face of the scrapers around an axis of rotation offset from the axis of rotation of the rotor feeder, results in a specific angle of the leading face of the scrapers relative to the leading face of the tines.

In an advantages embodiment of the rotor feeder unit according to the invention the scraper position adjusting arrangement comprises a scraper bar having the scrapers arranged thereon and having a longitudinal axis extending substantially parallel to the axis of rotation of the rotor, a guide defining a path along which the scraper bar is movable, and arresting means for arresting the scraper bar in a position along said path. This arrangement allows for effective displacement of the leading face of the scrapers relative to the rotor feeder unit bottom for all scrapers at once.

In an advantageous embodiment thereof, the guide defines a path for at least three points of the scraper bar in a plane perpendicular to the longitudinal axis of the scraper bar. This advantageous feature provides an effective guide wherein for each position along the path a specific angle of the scraper bar relative to the rotor feeder unit bottom is defined. This feature is in particular effective to adapt the scraper position adjusting arrangement for rotating the scrapers about the axis of rotation of the rotor in accordance with the above described preferred embodiment.

In an advantageous embodiment thereof, the guide comprises at least one slot in opposing side walls of the rotor feeder unit between which side walls the scraper bar extends, wherein the at least three points of the scraper bar are defined by guiding pins arranged on the scraper bar and extending in the at least one slot. Although one slot could be provided for guiding all guiding pins, preferably a slot is provided for each guiding pin.

In an advantages embodiment of the rotor feeder unit according to the invention, the scraper position adjusting arrangement is adapted for manual operation thereof.

In an advantageous embodiment of the rotor feeder unit the scraper position adjusting arrangement comprises an actuator acting on the scrapers and configured for displacing the leading face of the scrapers relative to the rotor feeder unit bottom. Such an actuator could be provided to allow manual operation of the scraper position adjusting arrangement from a remote location, for instance from an operator console. Moreover, providing an actuator acting on the scrapers and configured for adjusting the position of the leading face of the scrapers relative to the rotor feeder unit bottom, allows for displacement of the leading face during operation of the rotor unit.

Additionally or alternatively, the scraper position adjusting arrangement comprises a controller configured for controlling the actuator and at least one sensor for measuring at least one operational parameter of the rotor feeder unit or of an agricultural machine in which the rotor feeder unit is arranged, wherein the controller is configured for receiving measuring data from said sensor and for displacing the leading face of the scrapers relative to the rotor feeder unit bottom based on said at least one operational parameter. This would allow for automated displacement of the leading face of the scrapers relative to the rotor feeder unit bottom to different conditions of operation of the rotor feeder unit or of an agricultural machine in which the rotor feeder unit is arranged.

In an advantageous embodiment thereof, said at least one operational parameter includes a parameter related to the mechanical load on the rotor feeder unit during operation. This allows for automated displacement the leading face of the scrapers relative to the rotor feeder unit bottom based on the mechanical load on the rotor feeder unit during operation. It is for instance foreseen that the controller is configured such that the leading face of the scrapers is displaced relative to the rotor feeder unit bottom to the effect that the reverse funnel shape of the end of the conveying channel is widened in case the load on the rotor exceeds a certain predetermined value. In an advantageous embodiment thereof said at least one operational parameter includes rotor torque.

Additionally or alternatively, the scraper position adjusting arrangement is adapted for allowing displacement of the leading face of the scrapers relative to the rotor feeder unit bottom as a function of the force exerted by crop material on the leading face of the scrapers. By measuring the displacement of the leading face of the scrapers relative to the rotor feeder unit bottom is thus possible to monitor the force exerted by the crop material on the scrapers as an indication of the crop pressure downstream of the rotor feeder. This information can advantageously be used in the control of other implements of the agricultural machine. When for instance there is an indication that the crop pressure is too low, the supply rate of crop material to the rotor feeder unit is too low. By subsequent controlling the agricultural machine or the vehicle that moves the agricultural machine over the ground to increase the speed over the ground the supply rate of crop material to the rotor feeder unit is increased, such that the crop pressure downstream of the rotor feeder is increased. The scraper position adjusting arrangement may for instance be provided with pretension means, in particular a spring or the like, that forces the scrapers into a certain position with a certain pretension opposite to the force that is exerted by the crop material on the scrapers. Once the force exerted on the scrapers by the crop material exceeds the pretension, the crop material will displace the scrapers. The displacement can be monitored and measured by means of a sensor adapted for measuring the displacement of the scrapers, and on the basis of the measured displacement a controller can subsequently control the operation of the agricultural machine.

The present invention further relates to a method for operating a rotor feeder unit for agricultural machines, in particular balers, wherein the rotor feeder unit comprises a rotor feeder carrying a set of tines, said rotor feeder being rotatable about an axis of rotation; a rotor feeder unit bottom distant from the rotor feeder forming a lower boundary of a conveying channel through the rotor feeder unit; and scrapers placed in conveying direction behind the rotor feeder, the scrapers extending in between the tines and having a leading face cooperating with the tines.

The method according to the invention comprises displacing the leading face of the scrapers relative to the rotor feeder unit bottom. As described herein above under reference to the rotor feeder unit according to the invention, displacing the leading face of the scrapers relative to the rotor feeder unit bottom allows for adjusting the conveying action of the rotor feeder unit to different conditions of operation of the rotor feeder unit or of an agricultural machine in which the rotor feeder unit is arranged. The latter in particular in case the displacement of the leading face of the scrapers relative to the rotor feeder unit bottom is based on at least one operational parameter of the rotor feeder unit or of an agricultural machine in which the rotor feeder unit is arranged. In an advantageous embodiment of the method according to the invention said at least one operational parameter includes a parameter related to the mechanical load on the rotor feeder unit during operation. In an advantageous embodiment thereof said at least one operational parameter includes rotor torque. Rotor torque is an effective indicator of the mechanical load on the rotor feeder unit during operation.

In an advantageous embodiment of the method according to the invention the method comprises reducing or increasing the mechanical load on the rotor feeder unit by displacing the leading face of the scrapers relative to the rotor feeder unit bottom.

Displacing the leading face of the scrapers relative to the rotor feeder unit bottom in accordance with the method according to the invention is furthermore advantageously employed for removing a plugging of the rotor feeder. By widening the reverse funnel shape defined by the leading face of the scrapers and the bottom wall of the rotor feeder unit, a plug of crop material is more easily removed.

Displacing the leading face of the scrapers relative to the rotor feeder unit bottom in accordance with the method according to the invention is furthermore advantageously employed for improving the density of the crop material downstream of the rotor feeder by increasing or decreasing the crop flow velocity. In case the rotor feeder unit feeds the feeder duct of a rectangular baler the density of the crop material in the feeder duct may thus be advantageously improved.

The present invention further relates to a method for operating an agricultural machine, in particular a baler, comprising a rotor feeder unit, said rotor feeder unit comprising:

a rotor carrying a set of tines, said rotor being rotatable about an axis of rotation;

a rotor feeder unit bottom distant from the rotor forming a lower boundary of a conveying channel through the rotor feeder unit; and scrapers placed in conveying direction behind the rotor, the scrapers extending in between the tines and having a leading face cooperating with the tines;

wherein the method comprises:

allowing a displacement of the leading face of the scrapers relative to the rotor feeder unit bottom as a function of the force exerted by crop material on the leading face of the scrapers;

measuring the displacement of the leading face of the scrapers;

controlling the operation of the agricultural machine on the basis of the measured displacement of the leading face of the scrapers.

BRIEF DESCRIPTION OF THE FIGURES

The accompanying drawings are used to illustrate present a non-limitative preferred exemplary embodiment of the present invention. The above stated and other advantages, features and objectives of the invention will become more apparent, and the invention better understood, from the following detailed description when read in combination with the accompanying drawings, in which.

DETAILED DESCRIPTION OF THE INVENTION

Figure 1:
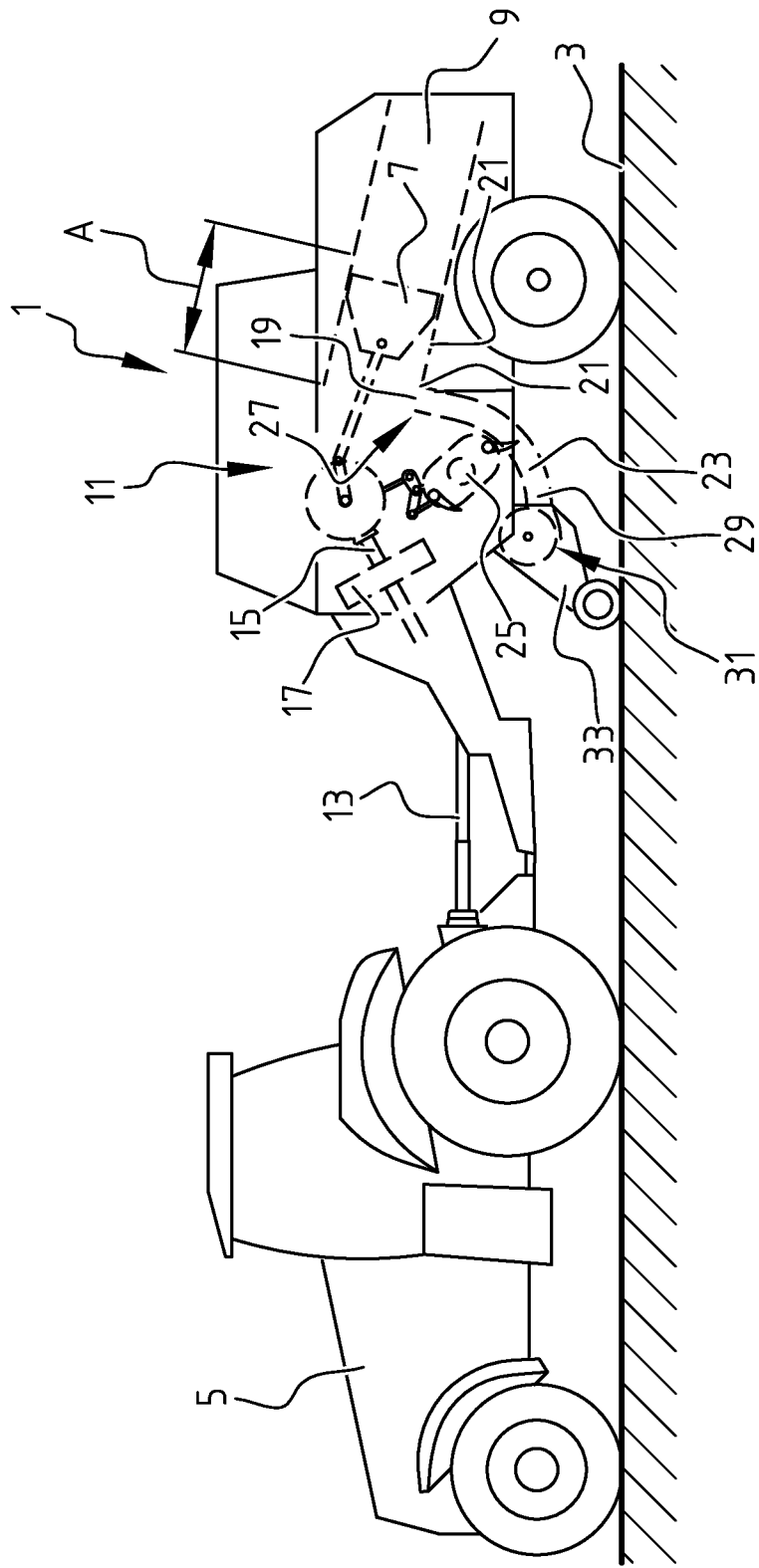
FIG. 1 shows a schematic side view of a rectangular baler, drawn and driven by a tractor, said baler being provided with an embodiment of a rotor feeder unit according to the invention arranged for conveying crop material to the feeder duct of the baler.

FIG. 1 shows a rectangular agricultural baler 1. Baler 1 can be moved forward over ground surface 3 by means of a tractor 5. In baler 1 is provided with a plunger 7 that during operation is moved reciprocally along a linear path A in bale case 9 by means of a crank mechanism 11 connected to plunger 7. Crank mechanism 11 is connected for driving via a drive shaft 13 to the motor of tractor 5. Tractor 5 is provided for this purpose with a power take-off device, also referred to as PTO. Drive shaft 13 connects an output shaft of the PTO of tractor 5 to an input shaft 15 of crank mechanism 11. A flywheel 17 is arranged on the input shaft of the crank mechanism.

The bale case 9 has an inlet opening 19 formed in the bottom wall 21 thereof. A feeder duct 23 communicates with the bale case 9 through the inlet opening 19 for charges of crop material to be transferred from the feeder duct 23 into the bale case 9. Feeder means 25 are operable within the feeder duct 23 to accumulate a charge of crop material therein and then stuff that accumulated charge into the bale case 9. The feeder duct 23 has an upper end 27 facing generally upwardly and communicating with the inlet opening 19 in the bale case 9 and a lower end 29 facing generally in a forward direction and communicating with a rotor feeder unit 31. The rotor feeder unit 31 is arranged for conveying crop material supplied by a pick-up device 33 into the feeder duct 23.

Figure 2:
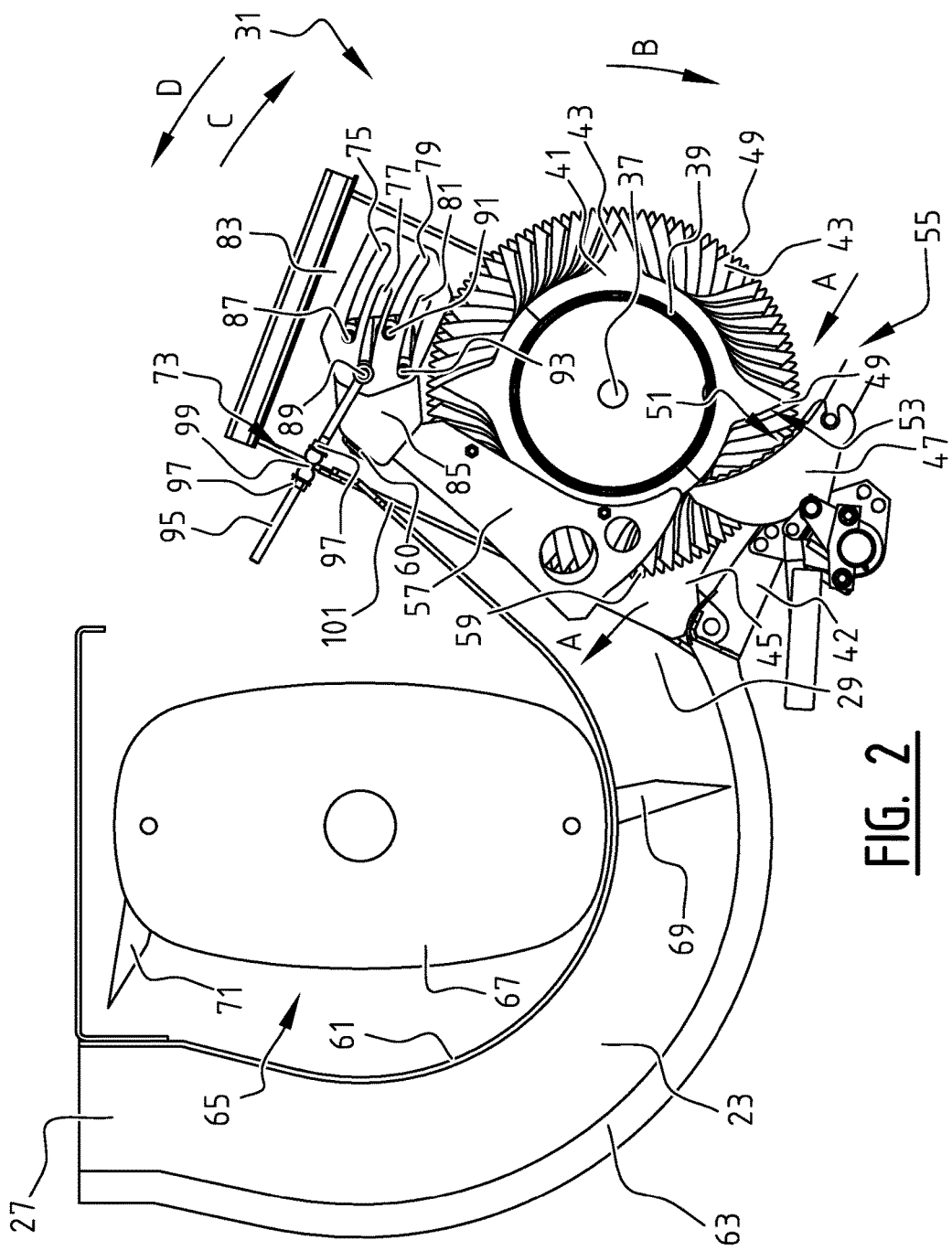
FIG. 2 shows in schematic side view the rotor feeder unit arranged in the rectangular baler of FIG. 1.
Figure 3:
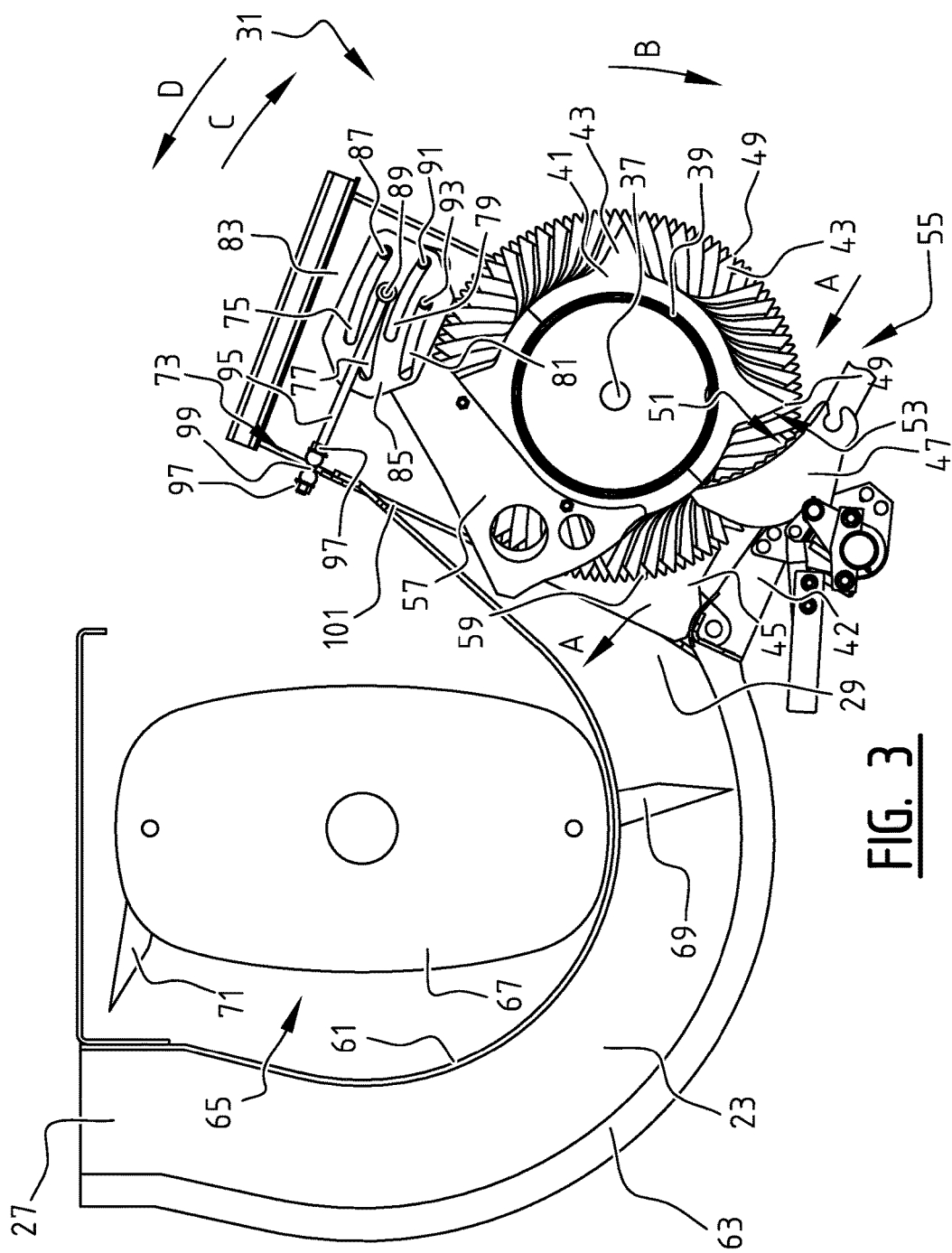
FIG. 3 shows in schematic side view the rotor feeder unit of FIG. 2 with the scrapers arranged in a different position.

In FIGS. 2 and 3 the rotor feeder unit 31 is shown in more detail. The rotor feeder unit 31 is provided with a rotor feeder 33 carrying a set of tines 43. The rotor feeder 33 is rotatable about axis of rotation 37. The rotor feeder 33 has a cylindrical base body 39 carrying tine plates 41 each including a plurality of tines 43. The tine plates 41 being parallel to each other in planes perpendicular to the axis of rotation 37 and distributed in the direction of the axis of rotation 37 of the base body 39 with intermediate distances in between.

A rotor feeder unit bottom 42 distant from the rotor feeder 33 forms a lower boundary of a conveying channel 45 through the rotor feeder unit 31. Cutting blades 47 protrude from the rotor feeder unit bottom 42 through the conveying channel 45 besides moving paths of the tine tips 49. The cutting blades 47 are parallel to each other in planes perpendicular to the axis of rotation 37 and distributed in the direction of the axis of rotation 37 with intermediate distances in between, such that each cutting blade 47 extends between two successive tine plates 41. Cutting edges 51 of the cutting blades 47 are oriented to counter the conveying direction A in the conveying channel 45 as defined by the direction B of rotation of the rotor feeder 33. The cutting edges 51 of the cutting blades 47 cooperate with the leading faces 53 of the tines 43 to cut crop material that is fed to the rotor feeder 33 at the inlet 55 of the conveying channel 45. The rotor feeder unit 31 is in the shown embodiment arranged for cutting crop material and may thus be referred to as a rotor cutter unit. Alternatively, the rotor feeder unit 31 may not have cutting blades 47. As a further alternative, the cutting blades 47 may be retractable from the conveying channel 45.

Scrapers 57 are placed in conveying direction A behind the rotor feeder 33. The scrapers 57 are mounted on a scraper bar 60 extending substantially parallel to the axis of rotation 37 of the rotor feeder 33. The scrapers 57 are parallel to each other in planes perpendicular to the axis of rotation 37 and distributed in the direction of the axis of rotation 37 with intermediate distances in between, such that each scraper 57 extends between two successive tine plates 41. Leading faces 59 of the scrapers 57 are oriented to counter the leading faces 53 of the tines 43 as the rotor feeder 33 is rotated in the direction of rotation B thereof. The leading faces 59 of the scrapers 57 and the leading faces 53 of the tines 43 cooperate to convey the cut crop material in conveying direction A toward the inlet of feeder duct 23. In particular, the scrapers 57 remove the crop material from the tines 43 as the tines pass the scrapers 57.

In the feeder duct 23 defined between a feeder duct upper wall 61 and feeder duct bottom wall 63 feeder means 65 including a rotatable drum 67 having tines 69, 71 arranged thereon are operable to convey cut crop material that has been conveyed by the rotor feeder unit 31 into the lower end 29 of the feeder duct 23 from the lower end 29 of the feeder duct 23 toward the upper end 27.

At the end of the conveying channel 45 the rotor feeder unit bottom 42 forms the lower boundary of the conveying channel 45 through the rotor feeder unit 31, while the leading faces 59 of the scrapers 57 form the upper boundary of the conveying channel 45. As shown in FIG. 2, the distance between the rotor feeder unit bottom 42 and the leading face 59 of the scrapers 57 in a plane perpendicular to the axis of rotation 37 of the rotor 31 increases in conveying direction A. As a result the end of the conveying channel 45 that is in communication with and that opens up in the lower end 29 of the feeder duct 23 has a reverse funnel shape in said plane perpendicular to the axis of rotation 37 of the rotor feeder 33.

The rotor feeder unit 31 is provided with a scraper position adjusting arrangement 73. The scraper position adjusting arrangement 73 includes the scraper bar 60 having the scrapers 57 arranged thereon. The scraper position adjusting arrangement 73 further includes a guide in the form of four slots 75, 77, 79, and 81 in opposing side walls 83 of the rotor feeder unit 31 between which side walls the scraper bar 57 extends. The scraper bar 60 is mounted at each end thereof on a mounting plate 85 that is parallel to the side walls 83. Each mounting plate 85 is provided with four guiding pins 87, 89, 91, 93 that each extends in one of the slots 75, 77, 79, and 81. The guiding pins 87, 89, 91, 93 and the slots 75, 77, 79, and 81, cooperate to define a path along which the scraper bar 60 is movable. For moving the scraper bar 60 along the path and arresting the scraper bar 60 at a desired location along said path, studs 95 are provided at each end of the scraper bar 60 that engage at one end the mounting plate 85 and that along the length thereof are in engagement with an adjusting assembly including two nuts 97 and a mounting member 99 mounted on a wall 101 of the rotor feeder unit. The mounting member 99 is rotatable relative to the wall 101 on which it is mounted and is provided with a hole through which the stud 95 extends. The nuts 97 are arranged on opposite sides of the mounting member 99. By turning the nuts 97 the scraper bar 60 is moved along the path defined by the slots and the guide pins. With both nuts 97 engaging the mounting member 99, the scraper bar 60 is arrested at a location along said path.

The slots 75, 77, 79, and 81 have a circular curve that has the axis of rotation 37 of the rotor feeder 33 as its centre. By moving the scraper bar 60 along the path, the scrapers 57 are rotated about the axis 37 of rotation of the rotor feeder 33. The rotation of the scrapers 57 about the axis 37 of rotation of the rotor feeder 33 results in an adjustment of the position of the leading face 59 of the scrapers 57 relative to the rotor feeder unit bottom 42. From the position of the scraper bar 60 shown in FIG. 2, a movement of the scraper bar 60 along the path in the direction of arrow C results an angular displacement of the scrapers 59 about the axis of rotation 37 of the rotor 33 in the direction of arrow C. As shown in FIG. 3, as a result thereof the reverse funnel shape of the end of the conveying channel 45 that is defined by the rotor feeder unit bottom 42 and the leading face 59 of the scrapers 57 is widened. From the position of the scraper bar 60 shown in FIG. 3 a subsequent movement of the scraper bar 60 along the path in the direction of arrow D would result in an angular displacement of the scrapers 59 about the axis of rotation 37 of the rotor feeder 33 in the direction of arrow D. As a result thereof the reverse funnel shape of the end of the conveying channel 45 defined by the rotor feeder unit bottom 42 and the leading face 59 of the scrapers 57 would be narrowed.

In FIGS. 2 and 3 two extreme positions of the scraper bar 60 along the path are shown, respectively. The scraper bar 60 can be arrested on any position along the path between the shown extreme positions.

Although in FIGS. 2 and 3, the slots 75, 77, 79, and 81 have a circular curve that has the axis of rotation 37 of the rotor feeder 33 as its centre, it would alternatively be possible that the circular curve of the slots 75, 77, 79, and 81 has as its centre an axis that is offset from the axis of rotation 37 of the rotor feeder 33. Moving the scraper bar 60 along the path, would then result in a rotation of the scrapers 57 around the offset axis of rotation. It would also be possible that the curve is not circular. It would even be possible that the slots are straight, such that by moving the scraper bar 60 along the path, the scrapers 57 are translated instead of rotated. It would also be possible that the slots are arranged in a plate that is itself arranged to be selectively moved relative to the side walls 83 of the rotor feeder unit 31 along a second path.

In an alternative of the embodiment shown in FIG. 2, a spring could be arranged between the mounting member 99 and the nut 97 on the left side of the mounting member 99, for positioning the scraper bar 60 along the path defined by the slots 75, 77, 79, 81 under a certain pretension. If during operation the force exerted on the leading face 59 of the scrapers 57 exceeds a certain value defined by the applied pretension, the scraper bar 60 is forced by the crop material top move along the path in the direction of arrow C. This forced displacement could advantageously be measured by means of a sensor as an indication of the force exerted by the crop material on the leading face 59 of the scrapers 57. This indication of the force exerted by the crop material on the leading face 59 of the scrapers 57 may be used by a controller that controls the operation of the baler.

In FIGS. 2 and 3 the scraper position adjusting arrangement 73 is adapted for manual operation thereof.

Figure 4:
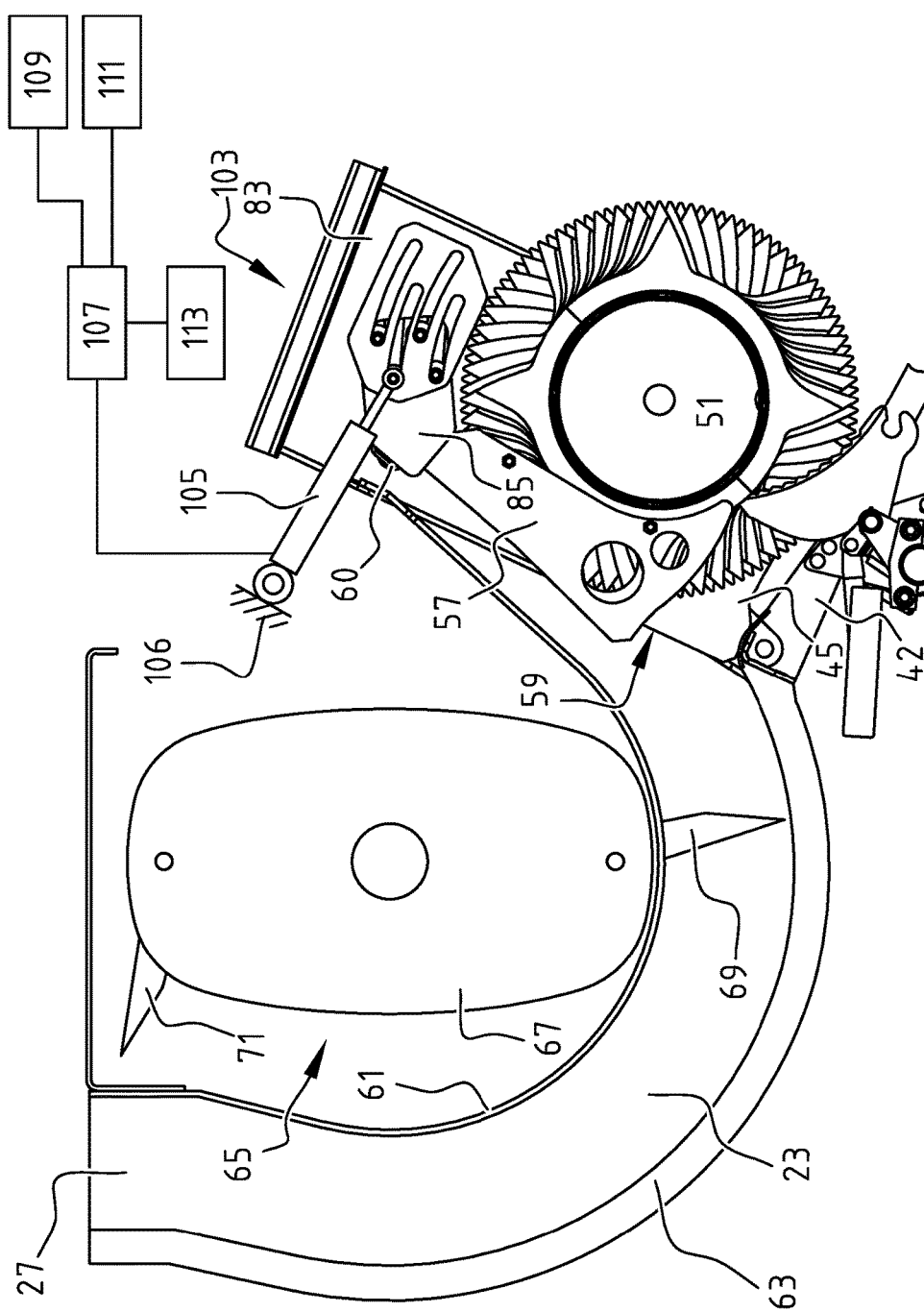
FIG. 4 shows in schematic side view an alternative embodiment of the rotor feeder unit shown in FIGS. 2 and 3.

In FIG. 4 an alternative embodiment of the rotor feeder unit shown in FIG. 2 is shown with a different scraper position adjusting arrangement 103. In particular, instead of studs 95 and an adjusting assembly including two nuts 97 and a mounting member 99, linear actuators 105 are provided at each end of the scraper bar 60. The linear actuator 105 engages at one end thereof the mounting plate 85 and is at the other end mounted on a mounting point 106 stationary relative to the side walls of the rotor feeder unit 31. The linear actuators 105 allow for moving the scraper bar 60 along the path by changing the length thereof and for arresting the scraper bar 60 at a desired location along said path by not changing the length thereof. The linear actuators 105 on either end of the scraper bar 60 are controlled in unison by means of controller 107 that is connected with the linear actuators 105. The controller 107 is connected to an operator console 109, such that the operator of the baler 1 can remotely change the length of the linear actuator and therewith angularly displace the leading faces 59 of the scrapers 57 relative to the rotor feeder unit bottom 42.

Furthermore, the controller 107 is connected to sensor means 111 configured for sensing the orientation of the scrapers 57 relative to the rotor feeder unit bottom 42, such that the controller 107 can control the linear actuator based on sensor information regarding the orientation of the scrapers 57 relative to the rotor feeder unit bottom 42. Furthermore, the controller 107 is connected to sensor means 113 configured for sensing the torque on the rotor feeder 33, such that the controller 107 can control the linear actuator based on sensor information regarding the torque on the rotor feeder 33. For instance, the controller 107 can be configured to cause the reverse funnel shaped end of the conveying channel 45 to widen in case the torque on the rotor feeder 33 exceeds a predetermined value.

Although the principles of the invention have been set forth above with reference to specific embodiments, it must be understood that this description is given solely by way of example and not as limitation to the scope of protection, which is defined by the appended claims.

What is claimed is:

1. A rotor feeder unit for an agricultural machine, comprising:
    a rotor feeder having a cylindrical base body carrying tines plates, each of the tine plates including a plurality of tines, the rotor feeder being rotatable about an axis of rotation;
    a rotor feeder unit bottom distant from the rotor feeder forming a lower boundary of a conveying channel through the rotor feeder unit;
    scrapers placed in conveying direction behind the rotor feeder, each of the scrapers extending in between the tines and having a portion extending around the cylindrical base body, each of the scrapers further comprises a leading face cooperating with the tines; and
    a scraper position adjusting arrangement configured for displacement of the leading face of the scrapers relative to the rotor feeder unit bottom, the scraper position adjusting arrangement further configured for rotating the scrapers about the axis of rotation of the rotor feeder for angularly displacing the leading face of the scrapers relative to the rotor feeder unit bottom and for displacing the extending portion of the scrapers relative to the cylindrical base body.

2. The rotor feeder unit according to claim 1, wherein the scraper position adjusting arrangement is provided with an arrangement for translating the leading face of the scrapers relative to the axis of rotation of the rotor feeder or rotating the leading face of the scrapers around an axis of rotation offset from the axis of rotation of the rotor feeder.

3. The rotor feeder unit according to claim 1, wherein the scraper position adjusting arrangement comprises:
    a scraper bar having the scrapers arranged thereon and having a longitudinal axis extending substantially parallel to the axis of rotation of the rotor feeder;
    a guide defining a path along which the scraper bar is movable; and
    an arrester for arresting the scraper bar in a position along the path.

4. The rotor feeder unit according to claim 3, wherein the guide defines a path for at least three points of the scraper bar in a plane perpendicular to the longitudinal axis of the scraper bar.

5. The rotor feeder unit according to claim 4, wherein the guide comprises at least one slot in opposing side walls of the rotor feeder unit between which side walls the scraper bar extends, wherein the at least three points of the scraper bar are defined by guiding pins arranged on the scraper bar and extending in the at least one slot.

6. The rotor feeder unit according to claim 1, wherein the scraper position adjusting arrangement is adapted for manual operation thereof.

7. The rotor feeder unit according to claim 1, wherein the scraper position adjusting arrangement comprises an actuator acting on the scrapers and configured for displacing the leading face of the scrapers relative to the rotor feeder unit bottom.

8. The rotor feeder unit according to claim 7, wherein the scraper position adjusting arrangement comprises a controller configured for controlling the actuator and at least one sensor for measuring at least one operational parameter of the rotor feeder unit or of an agricultural machine in which the rotor feeder unit is arranged, wherein the controller is configured for receiving measuring data from the sensor and for displacing the leading face of the scrapers relative to the rotor feeder unit bottom based on the at least one operational parameter of the rotor feeder unit.

9. The rotor feeder unit according to claim 8, wherein the at least one operational parameter includes a parameter related to a mechanical load on the rotor feeder unit during operation.

10. The rotor feeder unit according to claim 9, wherein the at least one operational parameter includes rotor torque.

11. The rotor feeder unit according to claim 1, wherein the scraper position adjusting arrangement is adapted for allowing displacement of the leading face of the scrapers relative to the rotor feeder unit bottom as a function of the force exerted by crop material on the leading face of the scrapers.

12. The rotor feeder unit according to claim 1, wherein the scraper position adjusting arrangement comprises:
    a scraper bar having the scrapers arranged thereon and having a longitudinal axis extending substantially parallel to the axis of rotation of the rotor feeder; and
    a guide defining a path along which the scraper bar is movable, the guide having at least one slot formed as a circular curve that has the axis of rotation of the rotary feeder as the center thereof, the circular curve serving to define the path along which the scraper bar is movable.

\* \* \* \* \*